United States Patent

Butka

[11] Patent Number: 5,111,087
[45] Date of Patent: May 5, 1992

[54] PROPULSION SYSTEM

[76] Inventor: Kemal Butka, 372 Central Park West, Apt. 20J, New York, N.Y. 10025

[21] Appl. No.: 626,955

[22] Filed: Dec. 13, 1990

[51] Int. Cl.⁵ .............................................. H02K 44/02
[52] U.S. Cl. ........................................ 310/11; 417/50
[58] Field of Search .............................. 310/11; 417/50

[56] References Cited

FOREIGN PATENT DOCUMENTS

| 0197155 | 10/1985 | Japan | 310/11 |
| 0126153 | 5/1989 | Japan | 310/11 |
| 2133225A | 7/1984 | United Kingdom | 310/11 |

OTHER PUBLICATIONS

Experimental Propulsion System Has No Moving Parts, William J. Broad, New York Times, May 15, 1990, pp. C1 and C7.

Primary Examiner—Steven L. Stephan
Assistant Examiner—Judson H. Jones
Attorney, Agent, or Firm—Michael J. Striker

[57] ABSTRACT

A propulsion system has a unit generating electric current, a unit generating a magnetic field substantially perpendicular to the electric current, and a unit forming a duct arranged so that by interaction of the magnetic field and the electric current a force in a liquid accommodated in the duct is produced and the liquid is moved to apply a thrust. The unit forming a duct is formed as a closed duct so that the liquid circulates in the duct and does not escape from it.

13 Claims, 3 Drawing Sheets

PROPULSION SYSTEM

BACKGROUND OF THE INVENTION

The present invention relates generally to propulsion systems and more particularly to magnetohydrodynamic propulsion systems.

Propulsion systems of the above mentioned type are developed relatively recently, in particular in the United States, the Soviet Union and Japan. The known magnetohydrodynamic propulsion system involves an interaction of magnetic fields and fluids that conduct electricity. In a known magnetohydrodynamic propulsion system a pair of electrodes on either side of the thruster pass an electric current through for example sea water. At a right angle to the current is the magnetic field generated by the superconducting magnet. The interaction of the magnetic field and the current produces a strong force on the water, so that the water is moved through the duct in the center of the magnet. In known magnetohydrodynamic propulsion systems the system is open so that the water continuously or periodically enters the system and exits to produce a respective force.

SUMMARY OF THE INVENTION

Accordingly, it is an object of the present invention to provide a propulsion system which is a further modification of the existing magnetohydrodynamic propulsion systems.

In keeping with these objects and with others which will become apparent hereinafter, one feature of the present invention resides, briefly stated, in a propulsion system which has a magnetic field generator; means forming a throughgoing duct; an electric current generator arranged so that a magnetic field produced by said magnetic field generator and an electric current produced by said electric current generator interact and generate a force moving water through said duct to produce a thrust, said duct being formed as a closed passage such that water is always contained within the system and does not escape from the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
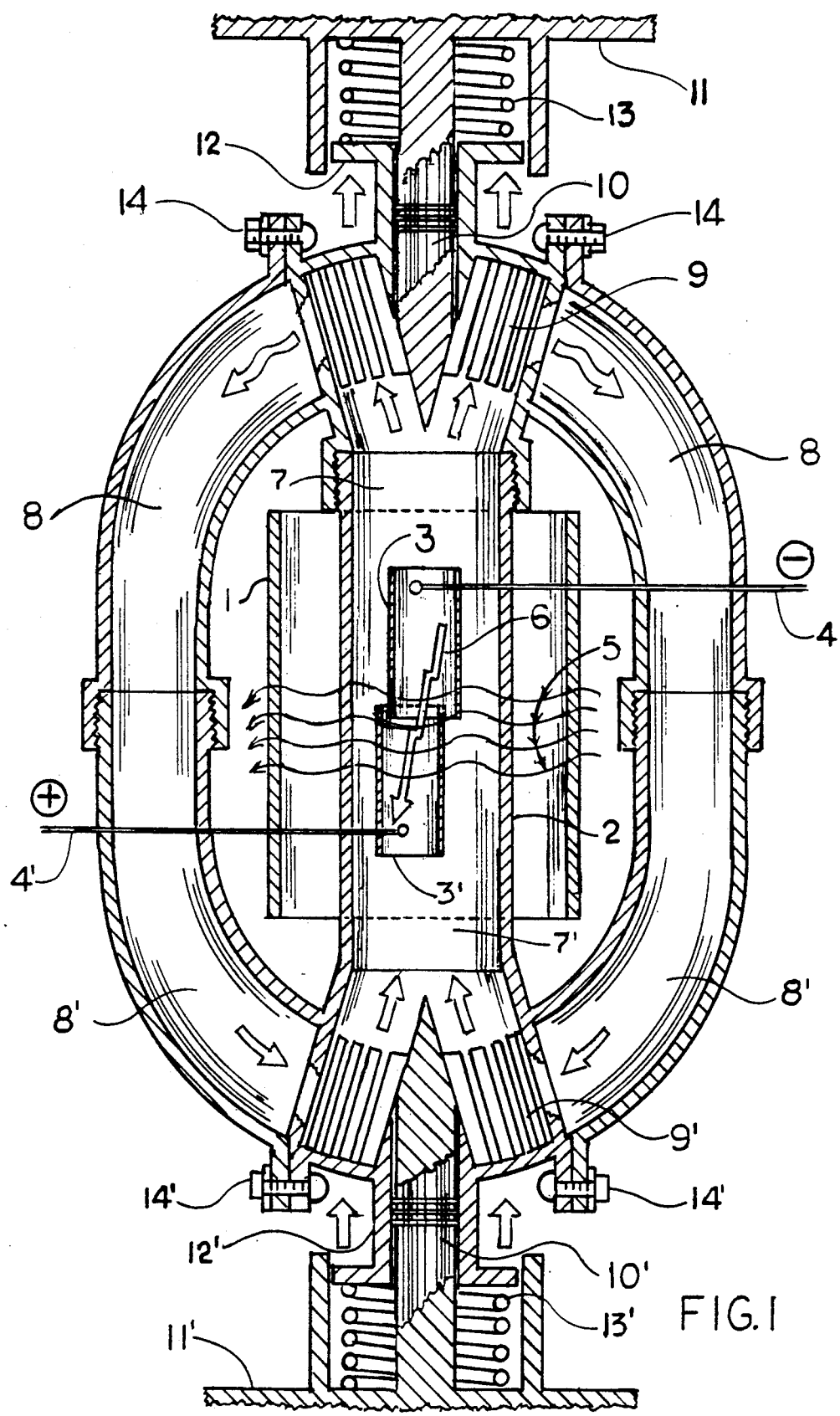
FIG. 1 is a view showing a section of a new propulsion system in accordance with the present invention.

A magnetoydrodynamic system shown in FIG. 1 has a magnetic field generating element which is identified with reference numeral 1 and can be formed as a superconducting magnet. The system has a core duct identified with reference numeral 2. Two electrodes 3 and 3' are arranged in the duct 2 and have respectively a negative charge and a positive charge. They are connected by conductors 4 and 4' to an electric source. The electric current produced by the electrodes 3 and 3' and identified as 6 is substantially perpendicular to the magnetic field produced by the superconductive magnet 1.

The core duct 2 is a part of a general duct system which, in addition to the core duct 2, includes side ducts 8 and 8'. The side ducts 8 and 8' communicate with one another. The side duct 8 communicates with the core duct 2 through an end portion 7 of the core duct 2 and transition ducts 9. The side core 8' communicates with the core duct 2 through an end portion 7' of the core duct 2 and transition ducts 9'. As can be seen from the drawings, the partial ducts 2, 7, 7', 8, 8', 9, 9' together form a closed duct system through which water can circulate without leaving the propulsion system as a whole. The transition ducts 9 and 9' are preferably shaped as slots. Due to this structure a part of water flowing through the transition ducts 9 diminishes its thrust and at the same time augments the driving thrust and turns around being attracted by the suction effect of the opposite end of the transisition ducts 9'.

In the propulsion system in accordance with the present invention, two piston-like members 10 and 10' are provided on the opposite sides as considered in an axial direction. The piston-like members 10 and 10' are connected with parts 11 and 11' of a vehicle in which the propulsion system is to be used. The piston-like members 10 and 11 are guided in cylinder-like members 12 and 12' provided on opposite axial sides of the system. Two springs 13 and 13' are arranged between the cylinder-like members 12 and 12' and the vehicle parts 11 and 11' to keep a reversing movement very smooth at both ends and to silently transmit the thrust to the vehicle 11, 11'.

As can be seen from the drawings, during actuation of the electric current producing elements and the magnetic field producing elements, the water is propelled through the duct system and produces a thrust force applied to a vehicle as indicated by corresponding arrows.

Figure 2:
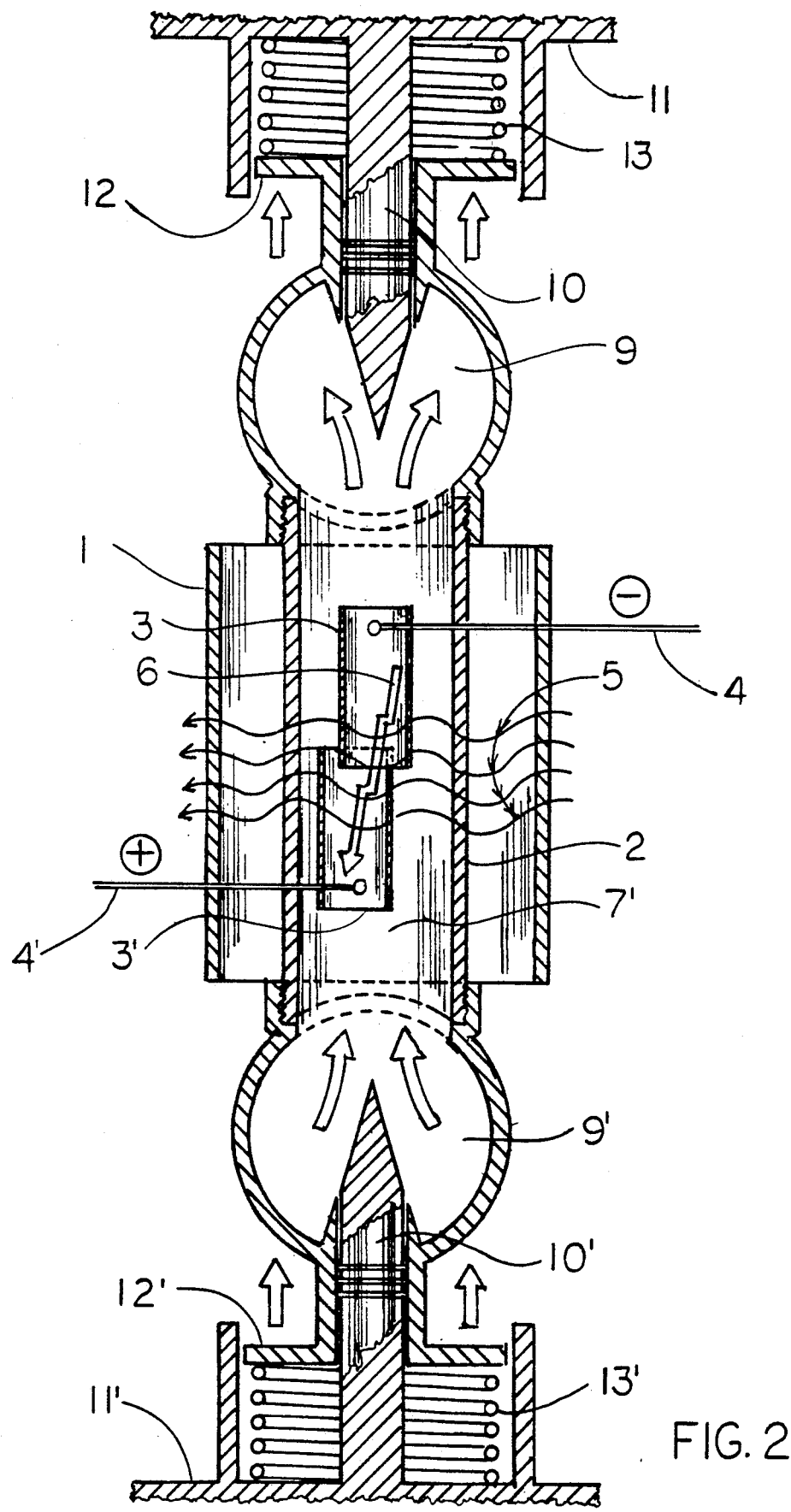
FIG. 2 is a view substantially corresponding to the view of FIG. 1, but showing a further modification of the propulsion system of the invention.
Figure 3:
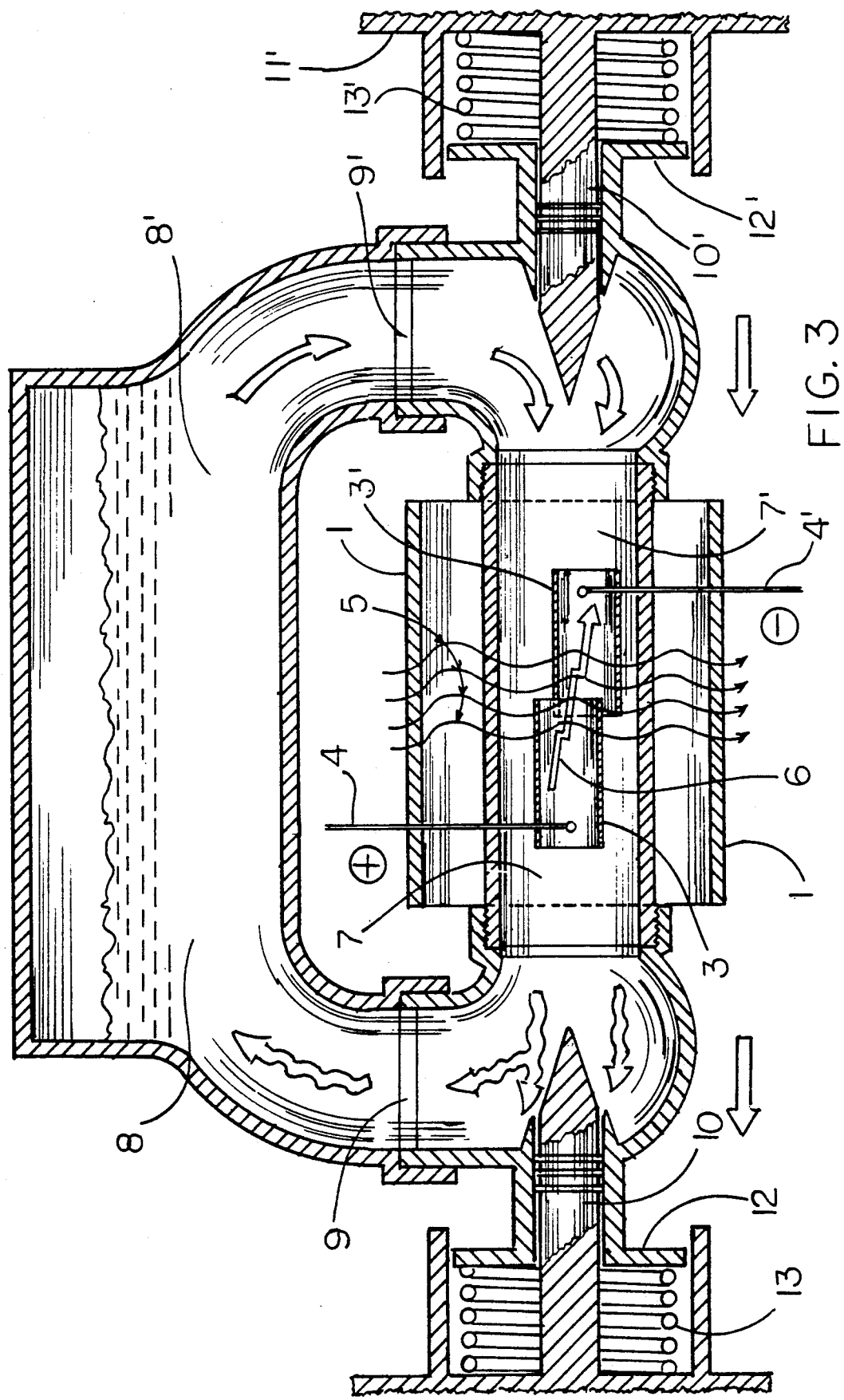
FIG. 3 is a view showing a section of the propulsion system of FIG. 2.

FIGS. 2 and 3 show a further modification of the inventive propulsion system. In this system the side ducts 8 and 8' are located only at one side of the axis of the propulsion system and connected with one another by a reservoir 8''. Transition ducts 9 and 9' are also formed in a somewhat different manner. The reservoir 8, 8', 8'' is positioned lengthwise on the top of the propulsion system. The thrust is again directed toward the vehicle to be driven. Water or other liquid, after having exerted its thrust in direction to the vehicle, is pressed upwards through the side duct 8, passes through the reservoir 8'' and returned downwards through the side duct 8' to the other transition duct 9' where it is subject to suction following the propulsion forwardly through the core duct 2.

As can be seen in the drawings the reservoir 8, 8', 8'' has vacuum and exceeds, in calculated proportion, the volume of the water or other liquid amount necessary for appropriate propulsion process based on the magnetohydrodynamic principle.

It will be understood that each of the elements described above, or two or more together, may also find a useful application in other types of constructions differing from the types described above.

While the invention has been illustrated and described as embodied in a propulsion system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A propulsion system, comprising means generating electric current; means generating a magnetic field substantially perpendicular to the electric current; and means forming a duct arranged so that by interaction of the magnetic field and the electric current a force in a liquid accommodated in said duct is produced and the liquid is moved to apply a thrust, said means forming a duct being formed as a closed duct so that the liquid circulates in the duct and does not escape from it, said duct having an axis and including a core duct portion arranged in the region of said means for generating an electric current and means for generating a magnetic field, at least one side duct portion communicating with said core duct portion, and a transition duct portion communicating said side duct portion with said core duct portion, said transition duct portion being formed by a least one slot.

2. A propulsion system, comprising means generating electric current; means generating a magnetic field substantially perpendicular to the electric current; and means forming a duct arranged so that by interaction of the magnetic field and the electric current a force in a liquid accommodated in said duct is produced and the liquid is moved to apply a thrust, said means forming a duct being formed as a closed duct so that the liquid circulates in the duct and does not escape from it, said duct having an axis and including a core duct portion arranged in the region of said means for generating an electric current and means for generating a magnetic field, at least one side duct portion communicating with said core duct portion, said side duct portion being formed as a single reservoir located only at one side of said axis of said core duct portion.

3. A propulsion system, comprising means generating electric current; means generating a magnetic field substantially perpendicular to the electric current; means forming a duct arranged so that by interaction of the magnetic field and the electric current a force in a liquid accommodated in said duct is produced and the liquid is moved to apply a thrust, said means forming a duct being formed as a closed duct to that the liquid circulates in the duct and does not escape from it; and means for connecting said duct with a vehicle so as to transfer the thrust to the vehicle.

4. A propulsion system as defined in claim 3, wherein said duct included a core duct portion arranged in the region of said means for generating an electric current and means for generating a magnetic field.

5. A propulsion system as defined in claim 4, wherein said core duct portion has an axis, said duct further having at least one side duct portion communicating with said core duct portion.

6. A propulsion system as defined in claim 5, wherein said duct further has a transition duct portion communicating said side duct portion with said core duct portion.

7. A propulsion system as defined in claim 6, wherein said transition duct portion is formed by at least one slot.

8. A propulsion system as defined in claim 7, wherein said transition duct portion is formed by a plurality of slots.

9. A propulsion system as defined in claim 5, wherein said duct has a second such side duct portion arranged at opposite side of said axis of said core duct portion and communicating with said core duct portion.

10. A propulsion system as defined in claim 5, wherein said side duct portion is formed as a single reservoir located only at one side of said axis of said core duct portion.

11. A propulsion system as defined in claim 2; and further comprising means for connecting said duct with a vehicle so as to transfer the thrust to the vehicle.

12. A propulsion system as defined in claim 2, wherein said connecting means includes a cylinder-piston structure including a cylinder part and a piston part, one of said parts is connected with said duct, while the other of said parts is connectable with the vehicle.

13. A propulsion system as defined in claim 12; and further comprising a further such cylinder-piston structure including a cylinder part and a piston part, one of said parts being connected with said duct, while the other of said parts is connectable with the vehicle, said cylinder-piston structures being spaced from one another and located at opposite sides as considered in the direction transverse to said axis of said core duct.

* * * * *